United States Patent [19]

Dillon et al.

[11] Patent Number: 5,050,210

[45] Date of Patent: Sep. 17, 1991

[54] METALLIC CURRENT LIMITER

[75] Inventors: Philip L. Dillon, Arlington; Joseph L. Whitehead, Decatur, both of Tex.

[73] Assignee: Reliance Comm/Tec Corporation, Chicago, Ill.

[21] Appl. No.: 504,049

[22] Filed: Apr. 3, 1990

Related U.S. Application Data

[63] Continuation of Ser. No. 321,874, Mar. 10, 1989, abandoned.

[51] Int. Cl.5 .......................................... H04M 1/174
[52] U.S. Cl. .................................... 379/413; 379/399; 379/405
[58] Field of Search ............... 379/413, 405, 399, 345, 379/402, 398; 370/32.1

[56] References Cited

U.S. PATENT DOCUMENTS

| | | | |
|---|---|---|---|
| 4,431,869 | 2/1984 | Sweet | 379/413 X |
| 4,485,341 | 11/1984 | Welty et al. | 379/405 X |
| 4,612,417 | 9/1986 | Toumani | 379/413 |
| 4,716,358 | 12/1987 | Futcio | 323/316 |
| 4,800,586 | 1/1989 | Meier | 379/399 |

Primary Examiner—James L. Dwyer
Assistant Examiner—M. Shehata
Attorney, Agent, or Firm—Michael M. Rickin

[57] ABSTRACT

A circuit for the non-linear limiting of the metallic current flowing in telephone line conductors. The circuit senses the metallic current flowing in the conductors. If that current exceeds a predetermined limit, the circuit provides from a controlled and variable voltage source a voltage across the conductors whose amplitude is reduced from the essentially constant amplitude voltage provided across the conductors when the current does not exceed the limit. The reduction in voltage amplitude is sufficient to maintain the metallic current at the limit.

14 Claims, 2 Drawing Sheets

METALLIC CURRENT LIMITER

This is a continuation of co-pending application Ser. No. 07/321,874 filed on Mar. 10, 1989 now abandoned.

BACKGROUND OF THE INVENTION

1. Field of the Invention

This invention relates to the limiting of the metallic current which flows in telephone line conductors and more particularly to non-linear limiting of such current.

2. Description of the Prior Art

There is often a need in telephone systems to limit the metallic or tip-to-ring dc current flowing in the telephone line conductors. Such current is fed to a subscriber line. The means used to limit current may be active or passive, linear or non-linear, but has traditionally consisted of current limiting resistors, which may be actual physical resistors, or may be the winding resistance of a relay or transformer. By far the most common battery feed circuit which has been used over the last 50 years or so can be characterized, for DC purposes, as being 48 Vdc in series with 400 ohms.

A necessary characteristic of such current limiting arrangements is that they have good longitudinal balance. Such balance ensures that longitudinal currents, i.e.- ground referenced currents, induced in the telephone line conductors from the commercial power system, or from other interference sources, are not converted into metallic signals which are heard as audible noise by the telephone user. To this end, unless the dc voltage source used to feed current is isolated from earth ground, or only connected thereto through a large resistance (floating battery), the resistances inserted in the tip and ring conductors of the telephone line interface circuit for current limiting purposes are required to be well matched. Any non-linear elements used for current limiting purposes are usually required to be heavily bypassed with large capacitors to maintain adequate balance and prevent the generation of harmonics of the interfering frequency. Such large capacitors usually adversely affect the transient behavior of the current limiting circuit in which they are used so as to impair the transmission and detection of dial pulses and supervisory signals.

The use of floating battery systems, though increasing, cannot be said to be well accepted in the telephone industry. Such systems cause many problems with equipment not designed to be compatible with them. They may also contribute to corrosion of the telephone outside plant by electrolysis. Additionally, because of the high longitudinal impedance floating battery systems impose between the telephone line conductors and earth ground, they cause the longitudinal ac voltage at the interface between the battery feed circuit and the telephone line to be one or several orders of magnitude higher than would have been the case if more traditional battery feed circuitry had been used.

Accordingly, it is an object of the present invention to allow non-linear current limiting of the metallic current flowing in the telephone line conductors, while remaining passive, well balanced, and resistive to the longitudinal currents which flow in these same conductors. It is a further object of the invention to perform such limiting in a manner which is virtually instantaneous, and thus has no adverse effect on the transmission and detection of dial pulsing or supervisory signals.

SUMMARY OF THE INVENTION

A circuit for limiting the amplitude of the metallic current flowing in a pair of telephone line conductors to a predetermined amplitude. The circuit includes means to sense only the metallic current flowing in the conductors and generating a signal having an amplitude indicative thereof.

The circuit also includes means which responds to the indicative signal and a signal having an amplitude representative of the predetermined limit amplitude of the metallic current. The means generates essentially instantaneously a control signal when the indicative signal exceeds the representative signal. The circuit further includes a controlled and variable voltage source which is connected between the telephone line conductors and the control signal generating means and also to a source of constant amplitude voltage. The controlled source responds to the control signal to provide across the telephone line conductors a voltage whose amplitude differs from the amplitude of the constant voltage by an amount sufficient to maintain the flowing metallic current at the predetermined amplitude.

DESCRIPTION OF THE PREFERRED EMBODIMENT

Figure 1:
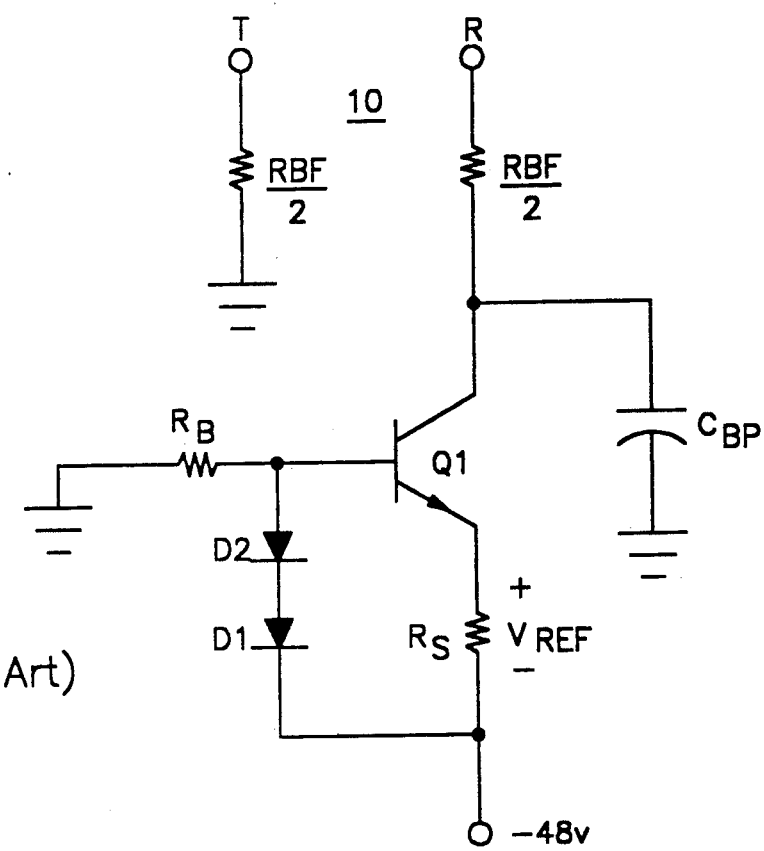
FIG. 1 shows one example of a prior art non-linear current limiter.

Referring now to FIG. 1, there is shown in simplified schematic form one example of a prior art non-linear current limiting circuit 10 used with a telephone line. Circuit 10 includes a transistor Q1 which has its base connected to ground by a resistor $R_B$. The emitter of Q1 is connected to a source of negative dc voltage, such as the $-48$ V central office battery, by a resistor $R_S$. The series combination of two diodes, D1 and D2, poled as shown are used to connect the base to the source of negative dc voltage. The voltage developed across resistor $R_S$ is designated as VREF.

The combination of resistors $R_B$ and $R_S$, diodes D1 and D2 and transistor Q1 form a current limiter with limited current at the collector of Q1. That current is essentially equal to VREF divided by $R_S$.

A capacitor $C_{BP}$ is connected between the collector of Q1 and ground. Capacitor $C_{BP}$ is used to bypass the limiter. The limiter intrinsically has a very high impedance when limiting. When not limiting, it has an impedance equal to $R_S$ for forward currents and a highly non-linear impedance for reverse currents (with respect to Q1). The purpose of the capacitor is then to bypass either $R_S$ or the non-linearity of Q1. This assures adequate longitudinal balance. The capacitor $C_{BP}$ must be quite large in order to accomplish the above purpose. A capacitor having a capacitance of 200 uf is quite typical for the prior art embodiment shown in FIG. 1.

While the use of capacitor $C_{BP}$ assures adequate longitudinal balance, it also makes the limiter very sluggish. Far from instantaneously limiting the current to the design value, the telephone line, on demanding current through resistor $R_{BF}$, must discharge $C_{BP}$ before the limit can be established. Thus, initial current is permitted which may exceed the limit substantially for tens to hundreds of milliseconds.

Conversely, once limiting has stabilized, if the demand for current is reduced, the capacitor voltage can neither be quickly reduced by the line, whose resistance has increased, nor by the transistor. The transistor can only change the capacitor voltage at the rate $I_{LIM}/C_{BP}$, where $I_{LIM}$ is the design current limit. Clearly, the transient behavior of the current depends heavily on the capacitor, which is necessarily large. Other topologies may permit the use of a physically and electrically smaller capacitor by incorporating the capacitor in a collector to base feedback path. Even in those topologies, the capacitor remains effectively large electrically, since it is multiplied by feedback effects.

The poor transient performance of this type of prior art limiter leaves the current uncontrolled for substantial periods of time following any change in current demand. Accordingly, it has adverse effects on dial pulsing current and voltage waveforms, makes prompt off-hook and on-hook detection more difficult, and is generally poorly suited for use in circuits where control of transient effects is important.

Figure 2:
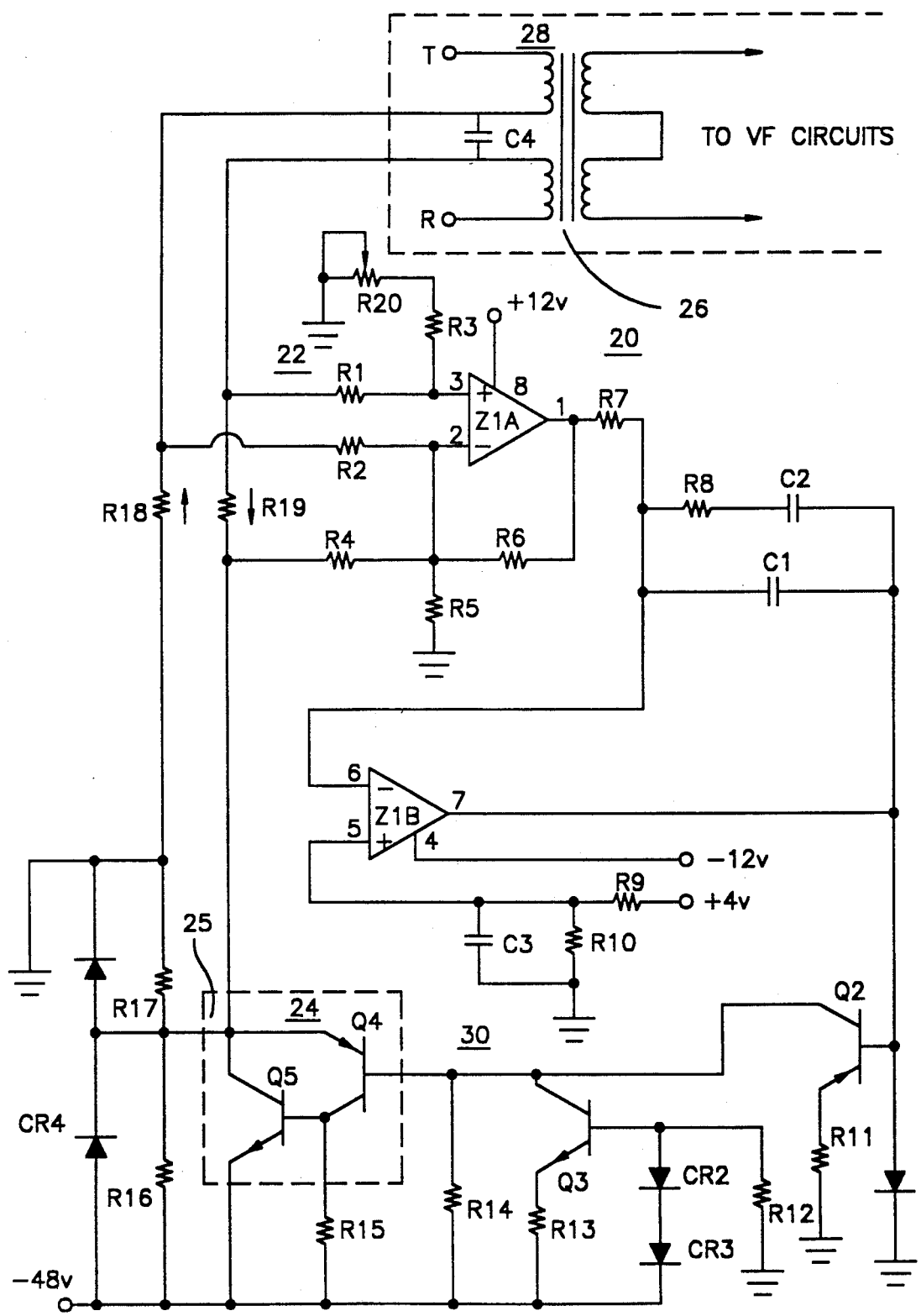
FIG. 2. shows one embodiment of the metallic current limiter of the present invention.

Referring now to FIG. 2, there is shown one embodiment for the metallic current limiting circuit 20 of the present invention. Resistors R1 through R6, R18 through R20, and amplifier Z1A form a metallic current sensor 22 which is later explained in more detail. Metallic current flow in resistors R18 and R19 produces a voltage at the output of Z1A, while longitudinal current flow produces no output voltage. More specifically, each milliampere (mA) of metallic current flow produces 90.9 mV at Z1A's output. Conventional current flow from tip (T) to ring (R), as shown, produces a positive output voltage at Z1A's output. At 33 mA, the current limit chosen in this embodiment, +3 V appears at Z1A's output.

Resistors R9 and R10 divide +4 V to provide a +3 V reference voltage at the non-inverting input to error amplifier Z1B. Capacitor C3 filters the divider output. Resistors R7 and R8 in combination with capacitors C1 and C2 form the error amplifier's compensation network. The error amplifier output drives level translating transistor Q2, which when conducting, functions as a current source.

Neglecting until later the function of transistor Q3 and associated components, the current sourced by transistor Q2 is driven into −48 V through resistor R14 to produce a voltage at the base of transistor Q4. Transistors Q4 and Q5, as interconnected, function together as a simulated single high gain PNP transistor 24 connected in the emitter follower configuration. The base of emitter follower simulated transistor 24 is the base of transistor Q4, the emitter of simulated transistor 24 is the junction 25 of the emitter of Q4 and the collector of transistor Q5. The emitter of Q5 is equivalent to the collector of this superbeta combination. The voltage at Q4's base, less a diode forward drop, thus appears at the emitter of the simulated transistor 24, and sinks the current which flows in resistor R19. The voltage available to produce metallic current is the voltage at the emitter of simulated transistor 24. Therefore, by controlling the voltage at Q4's base appropriately, the metallic current flowing in resistors R18 and R19 can be limited at any desired value.

Transistor Q3 and associated components form an approximately 300 uA current sink so that the simulated PNP transistor 24 has adequate base drive when operated at voltages close to −48 V. When the metallic current is below the metallic current limit, Q3 saturates, and for all practical purposes, connects the base of Q4 to −48 V through resistor R13. Of course, when metallic current is above the metallic current limit, Q2 must supply the 300 uA required by Q3, in addition to the current required to establish the necessary voltage at the base of Q4.

Clearly, when the metallic current limiter is actively limiting current, the circuitry comprised by transistor Q3, simulated transistor 24, and associated components functions as a variable dependent voltage source 30, controlled by the output of error amplifier Z1B.

The action of the current limiter may now be described. At any current below 33 mA, the voltage at the output of Z1A will be less than +3 V. The error amplifier Z1B, due to its large DC gain, will drive its output positive with respect to ground, and Q2 will be turned off. With Q2 not conducting, the voltage at the base of Q4 will be very close to −48 V. The emitter of Q4 will be one forward diode drop more positive. The voltage-current characteristics of the current limiter will be essentially the same as if resistor R19 were returned to −48 V.

Once the metallic current flow exceeds 33 mA, the voltage at the output of Z1A will exceed +3 V. The error amplifier Z1B output will become negative with respect to ground. Transistor Q2 will begin to conduct, and a current will be established in resistor R14 which will be exactly that required to produce the voltage at the emitter of Q4 which supports a metallic current of 33 mA. The lower the resistance which is placed between the tip (T) and ring (R) conductors, the more positive the feedback loop will drive the voltage at the emitter of Q4 to maintain 33 mA.

The current sensing amplifier Z1A does not respond to longitudinal current per se. The emitter follower formed by the simulated PNP transistor 24 is part of the feedback loop. It has an extremely low output impedance. Therefore, longitudinal current has no effect on circuit 20 operation, and the circuit 20 behaves very nearly as though resistor R19 was returned to an ideal DC voltage source whose voltage is exactly correct to support 33 mA of metallic current.

The error amplifier Z1B has extremely high gain at DC and at very low frequencies. At approximately 100 Hz, gain has fallen off to 10, where it remains until about 2100 Hz. At that frequency, the gain begins to be rolled off by capacitor C1 to assure high frequency stability. Long before that frequency, the bypass capacitor C4 associated with the isolation transformer 26 (neither of which are part of circuit 20) has become effective and high gain is no longer required. The feedback loop thus has quite high gain at the lower voice frequencies and at frequencies associated with dial pulsing and supervisory signals so that for all practical purposes it operates instantaneously and has no effect on signaling. It is a further benefit of the invention, that when limiting current, a very high low frequency impedance (compared to resistive battery feed) is apparent across the capacitor C4, thereby substantially improving the transmission performance of the isolation transformer-bypass capacitor combination 28.

Figure 3:
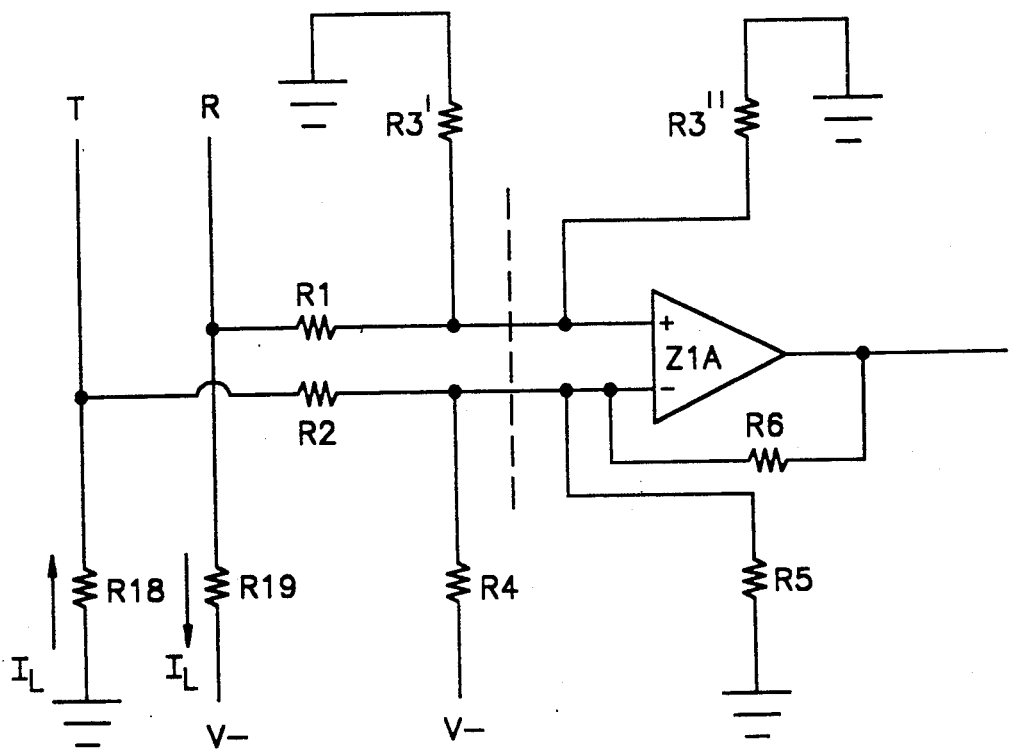
FIG. 3 is used to explain the operation of the metallic current sensor used in the invention.

It remains to explain the operation of the metallic current sensor 22. FIG. 3 is helpful in understanding the operation of this circuit. Components in FIG. 3 which bear the same reference designators as FIG. 2 have identical functions. Resistors R19 and R4, for ease of understanding, have been shown returned to a DC voltage, V—, instead of to the emitter of Q4. Further, two resistors, R3' and R3" have been added as an aid to understanding.

In one embodiment for sensor 22, the resistors were selected to have the following resistance values:

R1"R2=R3'=R4=200 Kohms
R3"=42.2 Kohms
R5=78.7 Kohms
R6=90.9 Kohms
R18=R19=100 ohms
R3 (see FIG. 2)=34 Kohms
R20 (see FIG. 2)=2K (adjustable)

Consider the Thevenin equivalent circuits for the circuitry to the left of the dotted line in FIG. 3. For those resistances, the loading effect of 400 Kohms on 100 ohms can be neglected. The open circuit voltages for the equivalent circuits associated with the non-inverting and inverting inputs, respectively, to amplifier Z1A are:

$$V_{oc+} = 100I_L/2 + V-/2 \quad (1)$$

$$V_{oc-} = -100I_L/2 + V-/2 \quad (2)$$

Again neglecting the 100 ohm sensing resistors R18 and R19, the Thevenin equivalent resistance in both cases is clearly 200 Kohms/2 or 100 Kohms. Note also, that except for the sign of the current related terms, equations (1) and (2) are identical. Since the circuit is linear, superposition applies, and it is easy to see that if the parallel combination of resistors R5 and R6 equals R3", the amplifier Z1A is at equilibrium with Vo=0 when $I_L$=0, that is, the applied voltage, V—, is cancelled. This result is valid, of course, for non-zero values of $I_L$ as well. Since the V— related terms cancel at the output of Z1A, it is clear that the output voltage, Vo, neglecting the small loading effect of resistors R1 and R4 on R18, and of resistors R2 and R3' on R19, is given by:

$$Vo = 2(I_L 100)(R6/R2) = 200I_L(R6/R2) = 200I_L(R6/R1) \quad (3)$$

Resistor R6 is chosen to establish the current-to-voltage gain. Resistor R5 is chosen to accomplish the required cancellation of applied voltage. Resistor R3" is chosen to reduce the voltages at the amplifier inputs to values within the amplifier's common mode input range. Clearly, any longitudinal (common mode) component of current flowing in resistors R18 and R19 cancels, and thus, the circuit responds only to the metallic (differential) component of current therein.

For the resistance values given above the parallel combination of resistors R5 and R6 in FIG. 2 will be found to be equal to R3" in FIG. 3. Also, in FIG. 2, it will be seen that the parallel combination of R3' and R3" lies within the range of values encompassed by R3 and R20 in series. Variable resistor R20 provides a means, with minimum effect on the accuracy of the current limiting provided by circuit 20, to balance the the amplifier input and maximize the longitudinal balance of the metallic current limiter circuit. Depending on the accuracy of the resistors associated with Z1A, and on the longitudinal balance requirements of the assembly of which the metallic current limiter forms a part, R3 and R20 may be replaced by a single fixed resistor.

The output voltage of amplifier Z1A provides a quite accurate indication of metallic loop current flow. Therefore, it may be used, in conjunction with an appropriate threshold voltage, to determine the off-hook status of the associated telephone line.

Referring once again to FIG. 2, diodes CR4 and CR5 of circuit 20 provide surge protection for transistor Q4 and Q5 and are not germane to the conceptual understanding of the metallic current limiter of the present invention.

Note that, were it not for the presence of resistors R16 and R17, when no DC current flows in the T and R conductors, longitudinal AC current could not be supported linearly since Q4 and Q5 would be driven into cutoff when the limiter was required to source current into the T and R conductors. Eventually, CR4 would conduct, and current could again be supported more or less linearly, until the part of the cycle was reached where both the transistors and CR4 were cut off again. This would result in the generation of harmonics which would increase noise in the telephone circuit in the idle condition and during the break period of dial pulsing. Noise in the idle condition may be tolerable, depending on the application, and noise during the break period of dialing is inconsequential. The aforementioned nonlinear effects also could conceivably interfere with off-hook detection, if the output voltage of Z1A were used for that purpose.

To the end of allowing the metallic current limiter to support longitudinal current linearly in the on-hook condition, resistors R16 and R17 form a voltage divider on the —48 V supply voltage. The Thevenin resistance of the divider is such as to be able to source 25 mA of peak current, which corresponds to the peak current of a 16 mA RMS sinewave. The divider open circuit voltage is chosen to be the mean of the voltage which would be present at the emitter of Q4 when the telephone line is shorted and —48 Vdc. This prebiases the simulated PNP transistor 24 formed by Q4 and Q5, and thus allows 25 mA to be sourced before the onset of serious non-linearity. The shunting effect of the divider also reduces the maximum power that Q5 must dissipate under both operating and fault conditions. It should be noted that R16 and R17 may not be necessary in all applications, and that both the open circuit voltage and equivalent resistance of the voltage divider may be changed to accommodate different applications.

It should be appreciated from the above explanation that circuit 20 functions to limit metallic current to a predetermined amplitude by providing across the T and R conductors a variable and controlled voltage from source 30. The amplitude of the voltage provided by source 30 is reduced from the constant amplitude voltage provided by the central office battery by an amount sufficient to maintain the metallic current at the predetermined limit when the metallic current exceeds the limit. It should further be appreciated that the amplitude of the voltage provided by source 30 is determined by the amplitude of the signal at the output of error amplifier Z1B. Source 30 may be viewed as generating, in response to the output signal from the error amplifier, an internal controlled variable voltage in series opposition to the battery voltage which when combined therewith results in the voltage provided by source 30 across the conductors.

It should also be appreciated that metallic current sensor 22 provides to the inverting input of error amplifier Z1B a voltage whose amplitude is representative of the amplitude of the metallic current flowing in the T and R conductors. It should further be appreciated that the voltage at the noninverting input to the amplifier is representative of the amplitude to which it is desired to limit the metallic current. In other words, that voltage may be said to be a threshold voltage which when exceeded by the voltage at the inverting input causes amplifier Z1B to provide the output to control source 30.

Finally, it should be appreciated that the current limiting circuit of the present invention is essentially transparent when the metallic current amplitude is below the desired threshold limit. By transparent, we mean that for such circumstances the voltage-current characteristics of circuit 20 are the same as if the R conductor was returned directly by resistor R19 to the source of constant voltage.

It is to be understood that the description of the preferred embodiment is intended to be only illustrative, rather than exhaustive, of the present invention. Those of ordinary skill will be able to make certain additions, deletions, and/or modifications to the embodiment of the disclosed subject matter without departing from the spirit of the invention or its scope, as defined by the appended claims.

What is claimed is:

1. A circuit for limiting the amplitude of metallic current flowing in a pair of telephone line conductors to a predetermined amplitude, said circuit comprising:
   a) means for sensing only said flowing metallic current and generating a signal having an amplitude indicative thereof;
   b) means responsive to said signal indicative of said flowing metallic current and to a signal having an amplitude representative of said predetermined metallic current limit amplitude for generating a first control signal when said indicative signal exceeds said representative signal, said control signal generating means having input means and output means;
   c) frequency compensating means connected between said control signal generating means input means and output means for providing said control signal generating means with stability at high frequencies and a transient response which does not adversely affect transmission and detection of dial pulses and supervisory signaling on said pair of telephone line conductors; and
   d) a controlled and variable voltage source connected between said control signal generating means and said telephone line conductors and to a source of constant amplitude voltage, said variable source responsive to said first control signal for providing across said telephone line conductors a voltage whose amplitude differs from the amplitude of said constant voltage by an amount sufficient to maintain said flowing metallic current at said predetermined limit amplitude.

2. The circuit of claim 1 wherein said control signal generating means is an error amplifier, said input means has a first input receiving said indicative signal and a second input receiving said representative signal and said first control signal is generated at said output means.

3. The circuit of claim 1 wherein said metallic current flow sensing means includes first means for sensing metallic current flow in one of said pair of conductors, second means for sensing metallic current flow in the other of said pair of conductors and means connected to said first and second sensing means for generating said indicative signal.

4. The circuit of claim 1 wherein said controlled and variable voltage source includes means responsive to said first control signal for generating a controlled variable voltage in series opposition to said constant voltage to thereby provide said voltage whose amplitude differs from the amplitude of said constant voltage.

5. The circuit of claim 1 wherein said control signal generating means generates a second control signal when said indicative signal is less than or equal to said representative signal.

6. The circuit of claim 5 wherein said controlled and variable voltage source includes means responsive to said first control signal for generating a controlled variable voltage in series opposition to said constant voltage to thereby provide said voltage whose amplitude differs from the amplitude of said constant voltage and responsive to said second control signal for generating an essentially zero voltage in series opposition to said constant voltage.

7. The circuit of claim 1 wherein said provided voltage amplitude is reduced from said constant amplitude voltage.

8. A circuit for connection to a pair of telephone line conductors and a source of constant amplitude voltage for limiting the amplitude of metallic current flowing in said conductors to a predetermined amplitude, said circuit comprising:
   a) means for sensing only said flowing metallic current and generating a signal having an amplitude indicative thereof;
   b) means responsive to said signal indicative of said flowing metallic current and to a signal having an amplitude representative of said predetermined metallic current limit amplitude for generating a first control signal when said indicative signal exceeds said representative signal, said control signal generating means having input means and output means;
   c) frequency compensating means connected between said control signal generating means input means and output means for providing said control signal generating means with stability at high frequencies and a transient response which does not adversely affect transmission and detection of dial pulses and supervisory signaling on said pair of telephone line conductors; and
   d) a controlled and variable voltage source connected to said control signal generating means and also for connection to said telephone line conductors and to said source of constant voltage, said variable source responsive to said first control signal for providing across said telephone line conductors a voltage whose amplitude differs from the amplitude of said constant voltage by an amount sufficient to maintain said flowing metallic current at said predetermined limit amplitude.

9. The circuit of claim 8 wherein said control signal generating means is an error amplifier, said input means has a first input receiving said indicative signal and a second input receiving said representative signal and said first control signal is generated at said output means.

10. The circuit of claim 8 wherein said metallic current flow sensing means includes first means for sensing metallic current flow in one of said pair of conductors, second means for sensing metallic current flow in the other of said pair of conductors and means connected to said first and second sensing means for generating said indicative signal.

11. The circuit of claim 8 wherein said controlled and variable voltage source includes means responsive to said first control signal for generating a controlled variable amplitude voltage in series opposition to said constant voltage to thereby provide said voltage whose amplitude differs from the amplitude of said constant voltage.

12. The circuit of claim 8 wherein said control signal generating means generates a second control signal when said indicative signal is less than or equal to said representative signal.

13. The circuit of claim 12 wherein said controlled and variable voltage source includes means responsive to said first control signal for generating a controlled variable voltage in series opposition to said constant voltage to thereby provide said voltage whose amplitude differs from the amplitude of said constant voltage and responsive to said second control signal for generating an essentially zero voltage in series opposition to said constant voltage.

14. The circuit of claim 8 wherein said provided voltage amplitude is reduced from said constant amplitude voltage.

* * * * *